United States Patent
Kudo (10) Patent No.: US 10,414,877 B2
(45) Date of Patent: Sep. 17, 2019

(54) HYDROGEL-FORMABLE COMPOSITION AND HIGH STRENGTH HYDROGEL FORMED FROM THE SAME

(71) Applicant: NISSAN CHEMICAL INDUSTRIES, LTD., Tokyo (JP)

(72) Inventor: Yoshihiro Kudo, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 104 days.

(21) Appl. No.: 15/562,270

(22) PCT Filed: Mar. 14, 2016

(86) PCT No.: PCT/JP2016/057985
§ 371 (c)(1),
(2) Date: Sep. 27, 2017

(87) PCT Pub. No.: WO2016/158349
PCT Pub. Date: Oct. 6, 2016

(65) Prior Publication Data
US 2018/0086884 A1    Mar. 29, 2018

(30) Foreign Application Priority Data
Mar. 27, 2015    (JP) .................. 2015-067622

(51) Int. Cl.
  *C08J 3/075*    (2006.01)
  *C08K 3/34*    (2006.01)
  (Continued)

(52) U.S. Cl.
  CPC ............. *C08J 3/075* (2013.01); *C08K 3/16* (2013.01); *C08K 3/34* (2013.01); *C08K 5/5317* (2013.01);
  (Continued)

(58) Field of Classification Search
  CPC ... C08J 3/075; C08K 3/16; C08K 3/34; C08K 5/5317; C08L 33/02; C08L 101/14
  See application file for complete search history.

(56) References Cited

FOREIGN PATENT DOCUMENTS

JP    2002-053629 A    2/2002
JP    2006-104141 A    4/2006
    (Continued)

OTHER PUBLICATIONS

Jun. 14, 2016 Written Opinion issued in International Patent Application No. PCT/JP2016/057985.
    (Continued)

*Primary Examiner* — John E Uselding
(74) *Attorney, Agent, or Firm* — Oliff PLC

(57) ABSTRACT

There are provided a hydrogel having a highly strengthened self-supporting property, which can be prepared by simply mixing at room temperature, and a method for producing the hydrogel. A hydrogel-formable composition capable of forming a hydrogel having a self-supporting property characterized by comprising: a water-soluble organic polymer having an organic acid structure, an organic acid salt structure, or an organic acid anion structure; a silicate; a compound having a diphosphonic acid structure of Formula (I):

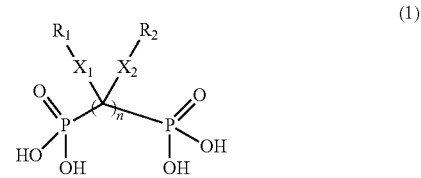

wherein $R_1$ and $R_2$ each are independently specific substituents, $X_1$ and $X_2$ each are independently a single bond or a (Continued)

linking group, and n is an integer of 1 to 5; or a salt thereof; and a compound having or generating a positive charge of divalent or more, a hydrogel which is formed from the composition, and a method for producing the hydrogel.

13 Claims, 2 Drawing Sheets

(51) Int. Cl.
*C08K 5/5317* (2006.01)
*C08L 33/02* (2006.01)
*C08L 101/14* (2006.01)
*C08K 3/16* (2006.01)

(52) U.S. Cl.
CPC ............. *C08L 33/02* (2013.01); *C08L 101/14* (2013.01); *C08J 2333/08* (2013.01); *C08K 2003/166* (2013.01)

(56) References Cited

FOREIGN PATENT DOCUMENTS

| | | | |
|---|---|---|---|
| JP | 2007-517823 | A | 7/2007 |
| JP | 2009-270048 | A | 11/2009 |
| JP | 2014-077111 | A | 5/2014 |
| WO | 2011/001657 | A1 | 1/2011 |
| WO | 2014/046127 | A1 | 3/2014 |
| WO | 2014/046136 | A1 | 3/2014 |
| WO | 2014/054702 | A1 | 4/2014 |
| WO | 2015/068837 | A1 | 5/2015 |
| WO | 2015/125968 | A1 | 8/2015 |
| WO | 2016/063836 | A1 | 4/2016 |

OTHER PUBLICATIONS

Jun. 14, 2016 Search Report issued in International Patent Application No. PCT/JP2016/057985.

HYDROGEL-FORMABLE COMPOSITION AND HIGH STRENGTH HYDROGEL FORMED FROM THE SAME

TECHNICAL FIELD

The present invention relates to a hydrogel, and more particularly, relates to a hydrogel-formable composition and a hydrogel having a highly strengthened self-supporting property obtained by using the hydrogel-formable composition.

BACKGROUND ART

A hydrogel has high biocompatibility because the main component of the hydrogel is water. In addition, it is a soft material with low environmental load. From these viewpoints, the hydrogel has attracted attention in recent years.

As a hydrogel having a highly strengthened self-supporting property, an organic-inorganic composite hydrogel obtained by carrying out polymerization reaction of a (meth) acrylamide derivative in the coexistence of a layered clay mineral homogeneously dispersed in water has been reported (Patent Document 1). As a similar report example, an organic-inorganic composite hydrogel having a polymer partially containing a carboxylic acid salt or a group having a carboxy anion structure in poly(meth)acrylamide and a clay mineral has been also known (Patent Document 2). In these report examples, the polymer to be formed and the clay mineral form a three-dimensional network structure by polymerizing monomers in the aqueous dispersion of the layered clay mineral and thus the organic-inorganic composite hydrogel is formed.

In these organic-inorganic composite hydrogels, however, unreacted monomers and reagents such as polymerization initiators that are concerned about toxicity may remain in the gel. For non-chemical manufacturers, the organic-inorganic composite hydrogel is difficult to produce and also difficult to mold a gel into any shapes because the hydrogel is formed after a chemical reaction.

As an organic-inorganic composite hydrogel having a self-supporting property, which can be produced by mixing at room temperature, the hydrogel containing a dendrimer compound having a polycationic functional group at its end and a layered clay mineral has been known (Patent Document 3). In this example, the dendrimer is produced by a multi-stage synthesis reaction and thus a problem of expensive production cost arises.

An organic-inorganic composite hydrogel that can be produced by simply stirring and mixing an electrolyte polymer, clay particles, and a dispersant has also been reported (Patent Document 4). In this organic-inorganic composite hydrogel, the clay particles homogeneously dispersed in the electrolyte polymer are crosslinked to form a gel structure. However, when the concentration of each component is increased in order to increase the strength of the gel, the viscosity of the hydrogel-formable composition is increased. In addition, the hydrogel-formable composition of which concentrations of each component are increased has a higher viscosity when the hydrogel-formable composition is mixed to form a gel. Consequently, for the organic-inorganic composite hydrogel described in Patent Document 4, production of the hydrogel may be remarkably difficult when the concentration of each component is increased in order to improve the strength of the gel.

PRIOR ART DOCUMENTS

Patent Documents

Patent Document 1: Japanese Patent Publication Application No. 2002-053629 (JP 2002-053629 A)
Patent Document 2: Japanese Patent Publication Application No. 2009-270048 (JP 2009-270048 A)
Patent Document 3: WO 2011/001657
Patent Document 4: Japanese Patent Publication Application No. 2014-077111 (JP 2014-077111 A)

SUMMARY OF THE INVENTION

Problems to be Solved by the Invention

As described above, a hydrogel having a highly strengthened self-supporting property, which can be prepared by using raw materials easily available in industry and by simply mixing at room temperature, has been desired.

Accordingly, the present invention has been made in view of the above circumstances, and an object of the present invention is to provide a hydrogel having a self-supporting property in which strength such as elastic modulus and breaking stress is significantly improved and which can be produced by simply mixing at room temperature. Another object of the present invention is to provide a method in which the hydrogel can be produced by using raw materials easily available in industry.

Means for Solving the Problem

As a result of extensive studies to solve the problems, the inventors of the present invention have found that a water-soluble organic polymer having an organic acid structure, an organic acid salt structure, or an organic acid anion structure, a silicate, a compound having a diphosphonic acid structure or a salt thereof, and a compound having or generating a positive charge of divalent or more are mixed, whereby a hydrogel having self-supporting properties having significantly improved strength such as elastic modulus and breaking stress is obtained and poor mixing operability caused when the concentration of each component is increased can be improved and thus have accomplished the present invention.

More specifically, as a first aspect, the present invention relates to a hydrogel-formable composition capable of forming a hydrogel having a self-supporting property characterized by comprising: a water-soluble organic polymer (A) having an organic acid structure, an organic acid salt structure, or an organic acid anion structure; a silicate (B); a compound having a diphosphonic acid structure of Formula (I):

(wherein
$R_1$ and $R_2$ each are independently a hydrogen atom, hydroxy group, a halogen atom, an optionally substituted linear, branched, or cyclic alkyl group, alkyloxy group, or alkylthio group having a carbon number of 1 to 12, an optionally substituted amino group, an optionally substituted monovalent $C_{6-12}$ aromatic group, or a monovalent $C_{3-12}$ heteroaromatic group having at least one nitrogen atom, oxygen atom, or sulfur atom as a ring-forming atom;

$X_1$ and $X_2$ each are independently a single bond or a linking group; and n is an integer of 1 to 5) or a salt thereof (C); and a compound (D) having or generating a positive charge of divalent or more.

As a second aspect, the present invention relates to the hydrogel-formable composition according to the first aspect, in which the compound or the salt thereof (C) is one or more compounds selected from the group consisting of a compound having a diphosphonic acid structure and a fully neutralized or partially neutralized sodium salt, potassium salt, and ammonium salt thereof.

As a third aspect, the present invention relates to the hydrogel-formable composition according to the second aspect, in which the compound or the salt thereof (C) is one or more compounds selected from the group consisting of etidronic acid, alendronic acid, risedronic acid, ibandronic acid, clodronic acid, minodronic acid, pamidronic acid, tiludronic acid, zoledronic acid, and 1,2-ethylenediphosphonic acid, and a fully neutralized or partially neutralized sodium salt, potassium salt, and ammonium salt of these acids.

As a fourth aspect, the present invention relates to the hydrogel-formable composition according to any one of the first aspect to the third aspect, in which the water-soluble organic polymer (A) is a water-soluble organic polymer having a carboxylic acid structure, a carboxylic acid salt structure, or a carboxy anion structure.

As a fifth aspect, the present invention relates to the hydrogel-formable composition according to the fourth aspect, in which the water-soluble organic polymer (A) is a fully neutralized or partially neutralized polyacrylate.

As a sixth aspect, the present invention relates to the hydrogel-formable composition according to the fifth aspect, in which the water-soluble organic polymer (A) is a fully neutralized or partially neutralized polyacrylate having a weight average molecular weight of 1,000,000 to 10,000,000.

As a seventh aspect, the present invention relates to the hydrogel-formable composition according to any one of the first aspect to the sixth aspect, in which the silicate (B) is water-swellable silicate particles.

As an eighth aspect, the present invention relates to the hydrogel-formable composition according to the seventh aspect, in which the silicate (B) is water-swellable silicate particles selected from the group consisting of smectite, bentonite, vermiculite, and mica.

As a ninth aspect, the present invention relates to the hydrogel-formable composition according to any one of the first aspect to the eighth aspect, in which the compound (D) is one or more compounds selected from the group consisting of a salt of an element of the third period to the fifth period and the second group to the fourteenth group in the periodic table, a hydroxide of the element, an oxide of the element, an polyvalent amine, and a salt of the polyvalent amine.

As a tenth aspect, the present invention relates to the hydrogel-formable composition according to the ninth aspect, in which the compound (D) is one or more compounds selected from the group consisting of magnesium chloride, magnesium bromide, magnesium sulfate, magnesium nitrate, magnesium carbonate, magnesium acetate, magnesium hydroxide, magnesium oxide, magnesium citrate, magnesium silicate, magnesium oxalate, magnesium fluoride, magnesium phosphate, magnesium benzoate, magnesium lactate, calcium chloride, calcium bromide, calcium sulfate, calcium nitrate, calcium carbonate, calcium acetate, calcium hydroxide, calcium oxide, calcium lactate, calcium phosphate, calcium diphosphate, calcium hexametaphosphate, aluminum sulfate, aluminum hydroxide, aluminum oxide, ethylenediamine dihydrochloride, ethylenediamine sulfate, bis(aminoethoxy)ethane dihydrochloride, and bis(aminoethoxy)ethane sulfate.

As an eleventh aspect, the present invention relates to a hydrogel having a self-supporting property, in which the hydrogel is formed from the hydrogel-formable composition as described in any one of the first aspect to the tenth aspect.

As a twelfth aspect, the present invention relates to a method for producing a hydrogel having a self-supporting property characterized by comprising: mixing the water-soluble organic polymer (A), the silicate (B), the compound or the salt thereof (C), the compound (D) each of which is specified in any one of the first aspect to the tenth aspect, and water or a water-containing solvent to form a gel.

As a thirteenth aspect, the present invention relates to a method for producing a hydrogel having a self-supporting property characterized by comprising: mixing two liquids of an aqueous solution formed by mixing the water-soluble organic polymer (A) and the compound (D) each of which is specified in any one of the first aspect to the tenth aspect and water or a water-containing solvent and an aqueous dispersion formed by mixing the silicate (B) and the compound or the salt thereof (C) each of which is specified in any one of the first aspect to the tenth aspect and water or a water-containing solvent to form a gel.

Effects of the Invention

As described above, according to the present invention, the hydrogel having a self-supporting property in which strength such as elastic modulus and breaking stress is significantly improved is obtained by using raw materials easily available in industry to simply mix the raw materials. Any shapes of gels can be prepared by pouring the hydrogel-formable composition into a mold before gelation or extrusion molding. At the time of gelation, a covalent bond forming reaction such as polymerization reaction is unnecessary and the gelation can be carried out even at room temperature, and thus the hydrogel-formable composition has high safety from the viewpoint of a production process. The hydrogel having any strength (breaking stress, elastic modulus, and the like) and transparency can be produced by adjusting the contents of each of the components.

MODES FOR CARRYING OUT THE INVENTION

The present invention includes a hydrogel-formable composition that can form a hydrogel having a self-supporting property and relates to the hydrogel-formable composition characterized by including a water-soluble organic polymer (A) having an organic acid structure, an organic acid salt structure, or an organic acid anion structure; a silicate (B), a compound having a diphosphonic acid structure or a salt thereof (C), and a compound (D) having or generating a positive charge of divalent or more.

The components of the hydrogel-formable composition and the hydrogel formed therefrom of the present invention include the water-soluble organic polymer (A) having an organic acid structure, an organic acid salt structure, or an organic acid anion structure; the silicate (B), the compound having the diphosphonic acid structure or the salt thereof (C), and the compound (D) having or generating a positive charge of divalent or more. In addition to the above components, any other components can be added, if necessary, within a range not impairing the desired effect of the present invention.

Here, the term "self-supporting property" of the hydrogel is customarily used without being defined in academic papers or patent documents. This term is used in the sense that the hydrogel can retain the shape of the gel without a support such as a container by having sufficient strength.

The elastic modulus of the obtained hydrogel can be measured by, for example, a piercing strength measurement apparatus. For example, a columnar hydrogel having a diameter of 28 mm and a height of 13 mm is prepared and the elastic modulus can be measured with Creep Meter RE2-3300513 manufactured by Yamaden Co., Ltd. In a measurement method, the stress is measured by pressing the gel from the upper part of the gel at a speed of 1 mm/sec using a columnar shaft having a diameter of 3 mm (a plunger manufactured by Yamaden Co., Ltd., a columnar shape, No. 3S, Type P-3S). The elastic modulus can be determined from the slope of the region having a small strain rate of the stress-strain curve obtained by the measurement. The elastic modulus of the hydrogel obtained in the present invention measured by the piercing strength measuring apparatus is 5 kPa to 5,000 kPa. For applications requiring a high elastic modulus, the lower limit value is 100 kPa or 150 kPa and the upper limit value is 500 kPa or 1,000 kPa. One example of the elastic modulus is 100 kPa to 500 kPa or 150 kPa to 1,000 kPa.

[Hydrogel-Formable Composition]

<Component (A): Water-Soluble Organic Polymer>

The water-soluble organic polymer (A) having an organic acid structure, an organic acid salt structure, or an organic acid anion structure is a polymer having organic acid groups such as a plurality of carboxy groups, sulfonyl groups, and phosphonyl groups, the salt structure or the anion structure of the organic acid groups as the side chains of the organic polymer and freely dissolved into water.

Examples of such a water-soluble organic polymer (A) include carboxy group-containing polymers such as a poly (meth)acrylate, a salt of carboxy vinyl polymer, or a salt of carboxymethyl cellulose; sulfonyl group-containing polymers such as a polystyrenesulfonate; and phosphonyl group-containing polymers such as a polyvinylphosphonate. Examples of the salt include a sodium salt, an ammonium salt, a potassium salt, and a lithium salt. In the present invention, (meth)acrylic acid means both acrylic acid and methacrylic acid.

In the present invention, the water-soluble organic polymer (A) preferably has the carboxylic acid structure, the carboxylic acid salt structure, or the carboxy anion structure. The water-soluble organic polymer (A) may be a crosslinked product or a copolymerized product and either a fully neutralized product in which all of the organic acid structure form the salt structure or a partially neutralized product in which the organic acid structure and the organic acid salt structure exist in a mixed state can be used.

The weight average molecular weight of the water-soluble organic polymer (A) is preferably 1,000,000 to 10,000,000 and more preferably 2,000,000 to 7,000,000 measured by gel permeation chromatography (GPC) in terms of polyethylene glycol.

In the present invention, the water-soluble organic polymer (A) is preferably a fully neutralized or partially neutralized polyacrylate and more preferably a fully neutralized or partially neutralized sodium polyacrylate. In particular, a fully neutralized or partially neutralized polyacrylate having a weight average molecular weight of 1,000,000 to 10,000,000 is preferable and a fully neutralized or partially neutralized non-crosslinked highly polymerized sodium polyacrylate having a weight average molecular weight of 2,000,000 to 7,000,000 or lower is particularly preferable. The degree of neutralization of the partially neutralization is 10% to 90% and preferably 30% to 80%.

The content of the water-soluble organic polymer (A) is 0.01% by mass to 20% by mass and preferably 0.1% by mass to 10% by mass, 0.1% by mass to 5% by mass, or 1% by mass to 10% by mass in 100% by mass of the hydrogel.

<Component (B): Silicate>

As the silicate (B), water-swellable silicate particles having high affinity and dispersibility to water are preferable. Examples of the silicate (B) include smectite, bentonite, vermiculite, and mica and the silicate (B) is preferably a silicate that forms a colloid in which water or a water-containing solvent is used as a dispersion medium. The smectite is a group name of montmorillonite, beidellite, nontronite, saponite, hectorite, and stevensite.

Examples of the shapes of the primary particles of the silicate particles include disk-like, plate-like, sphere-like, grain-like, cube-like, needle-like, rod-like, and amorphous shapes. For example, the shape is preferably the disk-like shape or the plate-like shape having a diameter of 5 nm to 1,000 nm.

Specific examples of the silicate include a layered silicate. Examples of easily available commercial products include LAPONITE XLG (synthesized hectorite), XLS (synthesized hectorite including sodium pyrophosphate as a dispersant), XL21 (sodium-magnesium-fluorosilicate), RD (synthesized hectorite), RDS (synthesized hectorite including inorganic polyphosphate as a dispersant), and S482 (synthesized hectorite including sodium etidronate as a dispersant) manufactured by Rockwood Additives Ltd.; Lucentite SWN (synthesized smectite) and SWF (synthesized smectite), Micromica (synthesized mica), and Somasif (synthesized mica) manufactured by Co-op Chemical Co., Ltd.; Kunipia (montmorillonite), Sumecton SA (synthesized saponite), and Sumecton ST (synthesized saponite) manufactured by KUNIMINE INDUSTRIES CO., LTD.; and BEN-GEL (purified natural bentonite product) manufactured by HOJUN Co., Ltd.

The content of the silicate (B) is 0.01% by mass to 50% by mass and preferably 0.1% by mass to 30% by mass, 0.1% by mass to 10% by mass, or 5% by mass to 30% by mass in 100% by mass of the hydrogel.

<Component (C): Compound Having Diphosphonic Acid Structure or Salt Thereof>

As the compound having the diphosphonic acid structure or the salt thereof (C), for example, a dispersant or a deflocculant used for the purpose of improving the dispersibility of the silicate or delaminating the layered silicate can be used and which also having chelate forming ability is used.

As the component (C) in the present invention, a compound having a diphosphonic acid structure of Formula (1):

(1)

(wherein $R_1$ and $R_2$ each are independently a hydrogen atom, hydroxy group, a halogen atom, an optionally substituted linear, branched, or cyclic alkyl group, alkyloxy group, or alkylthio group having a carbon atom number of 1 to 12, an optionally substituted amino group, an optionally substituted monovalent $C_{6-12}$ aromatic group, or a monovalent $C_{3-12}$ heteroaromatic group having at least one nitrogen atom, oxygen atom, or sulfur atom as a ring-forming atom;

$X_1$ and $X_2$ each are independently a single bond or a linking group; and n is an integer of 1 to 5) or a salt thereof is preferable.

Examples of the halogen atom include a fluorine atom, a chlorine atom, a bromine atom, and an iodine atom.

Examples of the linear alkyl group having a carbon number of 1 to 12 include methyl group, ethyl group, n-propyl group, n-butyl group, n-pentyl group, n-hexyl group, n-heptyl group, n-octyl group, n-nonyl group, n-decyl group, n-undecyl group, and n-dodecyl group.

Examples of the branched alkyl group having a carbon number of 1 to 12 include alkyl groups having a carbon atom number of up to 12 and branched at any position, in addition to i-propyl group, i-butyl group, s-butyl group, t-butyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, and a 1-ethyl-2-methyl-n-propyl group.

Examples of the cyclic alkyl group having a carbon number of 1 to 12 include monocyclic alkyl groups such as cyclopropyl group, cyclobutyl group, cyclopentyl group, cyclohexyl group, cycloheptyl group, and cyclooctyl group and polycyclic alkyl groups such as norbornyl group and adamantyl group.

Examples of the linear alkyloxy group having a carbon number of 1 to 12 include a linear (alkyl)-O— group having a carbon number of 1 to 12 in which the alkyl moiety has the above meaning, unless otherwise specified. Specific examples thereof include methoxy group, ethoxy group, n-propoxy group, and n-butoxy group.

Examples of the branched and cyclic alkyloxy group having a carbon number of 1 to 12 include a branched (alkyl)-O— and cyclic (alkyl)-O— group having a carbon number of 1 to 12 in which the alkyl moiety has the above meaning, similar to the description of the "linear alkyloxy group having a carbon number of 1 to 12", unless otherwise specified.

Examples of the linear alkylthio group having a carbon number of 1 to 12 include a linear (alkyl)-S— group having a carbon number of 1 to 12 in which the alkyl moiety has the above meaning, unless otherwise specified. Specific examples thereof include methylthio group, ethylthio group, and n-propylthio group.

Examples of the branched and cyclic alkylthio group having a carbon number of 1 to 12 include a branched (alkyl)-S— group and cyclic (alkyl)-S— group having a carbon number of 1 to 12 in which the alkyl moiety has the above meaning, similar to the description of the "linear alkylthio group having a carbon number of 1 to 12", unless otherwise specified.

The linear, branched, or cyclic alkyl group, alkyloxy group, and alkylthio group having a carbon number of 1 to 12 may be substituted. Examples of such a substituent are not particularly limited and examples of the substituent include an amino group, hydroxy group, cyano group, hydroxycarbonyl group, an alkoxycarbonyl group, and an aminocarbonyl group.

Examples of the optionally substituted amino group include methylamino group, ethylamino group, propylamino group, butylamino group, dimethylamino group, ethylmethylamino group, diethylamino group, methylpropylamino group, methylbutylamino group, and methylpentylamino group.

Examples of the monovalent $C_{6-12}$ aromatic group include phenyl group and naphthyl group.

The monovalent $C_{6-12}$ aromatic group may be substituted and such a substituent is not particularly limited. Examples of the substituent include a chlorine atom, a fluorine atom, an alkyl group, hydroxy group, an alkyloxy group, an amino group, an alkylamino group, carboxy group, an alkoxycarbonyl group, aminocarbonyl group, an alkylaminocarbonyl group, nitro group, and cyano group.

Examples of the monovalent $C_{3-12}$ heteroaromatic group having at least one nitrogen atom, oxygen atom, or sulfur atom as a ring-forming atom include pyrrolyl group, pyridyl group, quinolyl group, indolyl group, furyl group, benzofuranyl group, thienyl group, benzothienyl group, oxazolyl group, benzoxazolyl group, thiazolyl group, benzothiazolyl group, pyrazolyl group, imidazolyl group, pyrimidyl group, pyrazyl group, imidazo[1,2-a]pyridyl group, benzimidazolyl group, and quinoxalyl group.

Examples of the linking group include a $C_{1-5}$ alkylene group, an oxygen atom (—O—), a nitrogen atom (—N—), and a sulfur atom (—S—). Among them, methylene group, ethylene group, and the —S— group are preferable.

n is preferably 1 or 2 and 1 is more preferable.

As the compound having the diphosphonic acid structure of Formula (1) or a salt thereof (C), for example, a compound having an alkylenediphosphonic acid structure, or a fully neutralized or partially neutralized sodium salt, potassium salt, ammonium salt, and the like are preferable.

In the compound having the alkylenediphosphonic acid structure, the alkylene refers to a $C_{1-5}$ alkylene group, and among them, methylene group and ethylene group are preferable, and methylene group is more preferable.

The full neutralization means that all hydrogen ions that can be dissociated in the acid groups of the compound having the diphosphonic acid structure of Formula (1) are substituted with cations, whereas the partial neutralization means that part of the dissociable hydrogen ions in the acid groups of the diphosphonic acid is substituted with cations.

Specific examples of the compound having the diphosphonic acid structure of Formula (1) or the salt thereof (C) include etidronic acid, alendronic acid, risedronic acid, ibandronic acid, clodronic acid, minodronic acid, pamidronic acid, tiludronic acid, zoledronic acid, and 1,2-ethylenediphosphonic acid and the fully neutralized or partially neutralized sodium salt, potassium salt, and ammonium salt of these acids. Among them, etidronic acid and fully neutralized or partially neutralized sodium etidronate are preferable and disodium etidronate and tetrasodium etidronate are more preferable.

In the present invention, the component (C) may be used singly or in combination of two or more of them.

The content of the compound (C) is 0.01% by mass to 20% by mass and preferably 0.1% by mass to 5% by mass or 1% by mass to 10% by mass in 100% by mass of the hydrogel.

In the present invention, when the silicate containing a dispersant is used, the dispersant may or may not be further added.

<Component (D): Compound Having or Generating a Positive Charge of Divalent or More>

The compound (D) having or generating a positive charge of divalent or more refers to a compound itself having a positive charge of divalent or more or a compound generating divalent positive charge by dissolving in a solution or reacting with an acid. Examples of such a compound include a salt of an element of the third period to the fifth period and the second group to the fourteenth group in the periodic table, a hydroxide of the element, an oxide of the element, a polyvalent amine, and a salt of the polyvalent amine. Among them, the element of the second group or the thirteenth group in the periodic table is preferable.

As the salt, not only a simple salt but also a double salt such as alum, magnesium silicate aluminate and the like can be used.

Examples of the acid forming the salt include sulfuric acid, hydrochloric acid, hydrogen bromide, hydrogen fluoride, trifluoroacetic acid, acetic acid, phosphoric acid, diphosphoric acid, hexametaphosphoric acid, polyphosphoric acid, silicic acid, aluminic acid, trifluoromethanesulfonic acid, methanesulfonic acid, and p-toluenesulfonic acid.

Examples of the polyvalent amine include ethylenediamine, diaminopropane, diaminobutane, diaminopentane, hexamethylenediamine, bis(aminoethoxy)ethane, phenylenediamine, hydrazine, spermidine, and spermine.

Examples of the compound (D) include a salt of magnesium, a hydroxide of magnesium, an oxide of magnesium; a salt of calcium, a hydroxide of calcium, an oxide of calcium; a salt of aluminum, a hydroxide of aluminum, an oxide of aluminum; and a diamine and a salt of the diamine. Among them, the magnesium salt is preferable.

Specific examples of the compound (D) include magnesium chloride, magnesium bromide, magnesium sulfate, magnesium nitrate, magnesium carbonate, magnesium acetate, magnesium hydroxide, magnesium oxide, magnesium citrate, magnesium silicate, magnesium oxalate, magnesium fluoride, magnesium phosphate, magnesium benzoate, magnesium lactate; calcium chloride, calcium bromide, calcium sulfate, calcium nitrate, calcium carbonate, calcium acetate, calcium hydroxide, calcium oxide, calcium lactate, calcium phosphate, calcium diphosphate, calcium hexametaphosphate; aluminum sulfate, aluminum hydroxide, aluminum oxide; ethylenediamine dihydrochloride, ethylenediamine sulfate, bis(aminoethoxy)ethane dihydrochloride, and bis(aminoethoxy)ethane sulfate. Among them, magnesium chloride, magnesium bromide, magnesium sulfate, magnesium acetate, magnesium hydroxide, magnesium benzoate, and magnesium lactate are preferable.

The content of the compound (D) is 0.01% by mass to 20% by mass and preferably 0.1% by mass to 10% by mass, 0.1% by mass to 5% by mass, or 1% by mass to 10% by mass in 100% by mass of the hydrogel.

When the composition of the present invention is produced, the compound (D) can be used alone or in the form of a hydrate thereof.

A preferable combination of the water-soluble organic polymer (A), the silicate (B), the compound having the diphosphonic acid structure or the salt thereof (C), and the compound (D) having or generating a positive charge of divalent or more is 0.1% by mass to 10% by mass of a fully neutralized or partially neutralized non-crosslinked sodium polyacrylate having a weight average molecular weight of 2,000,000 to 7,000,000 as the component (A), 0.1% by mass to 30% by mass of water-swellable smectite or saponite as the component (B), 0.1% by mass to 5% by mass of sodium etidronate as the component (C), and 0.1% by mass to 10% by mass of magnesium chloride or magnesium sulfate as the component (D) in 100% by mass of the hydrogel.

A preferable combination of the components (A) to (D) is 0.1% by mass to 5% by mass of a fully neutralized or partially neutralized non-crosslinked sodium polyacrylate having a weight average molecular weight of 2,000,000 to 7,000,000 as the component (A), 0.1% by mass to 10% by mass of water-swellable smectite or saponite as the component (8), 0.1% by mass to 5% by mass of sodium etidronate as the component (C), and 0.1% by mass to 5% by mass of magnesium chloride or magnesium sulfate as the component (D) in 100% by mass of the hydrogel.

A preferable combination of the components (A) to (D) is 1% by mass to 10% by mass of a fully neutralized or partially neutralized non-crosslinked sodium polyacrylate having a weight average molecular weight of 2,000,000 to 7,000,000 as the component (A), 5% by mass to 30% by mass of water-swellable smectite or saponite as the component (B), 1% by mass to 10% by mass of sodium etidronate as the component (C), and 1% by mass to 10% by mass of magnesium chloride or magnesium sulfate as the component (D) in 100% by mass of the hydrogel.

In the present invention, the strength (breaking stress, elastic modulus, and the like) of the gel can be increased by selecting an appropriate combination ratio and/or increasing the content of each of the components (A) to (D).

The hydrogel-formable composition of the present invention may include a monovalent or polyvalent alcohol such as methanol, ethanol, and glycol, formamide, hydrazine, dimethyl sulfoxide, urea, acetamide, potassium acetate, and the like can be added as a compound that can be intercalated between the layers of the layered silicate layers to promote delamination.

The hydrogel-formable composition and the hydrogel of the present invention can include a water-containing alcohol and a water-containing polyvalent alcohol as a water-containing solvent. In the present invention, the water-containing alcohol is a mixed solution of a monovalent alcohol and water, while the water-containing polyvalent alcohol is a mixed solution of a polyvalent alcohol and water.

The monovalent alcohol is preferably a water-soluble alcohol that is freely dissolved in water and more preferably a $C_{1-8}$ alcohol. Examples of the monovalent alcohol include methanol, ethanol, 2-propanol, i-butanol, pentanol, hexanol, 1-octanol, and isooctanol.

The polyvalent alcohol is an alcohol of divalent or more. Examples of the polyvalent alcohol include glycerin, a polyglycerol (diglycerin, triglycerine, tetraglycerin, and the like), ethylene glycol, propylene glycol, a polyethylene glycol (PEG 600 and the like), diethylene glycol, triethylene glycol, tetraethylene glycol, dipropylene glycol, 1,5-pentanediol (pentamethylene glycol), 1,2,6-hexanetriol, octylene glycol (ethohexadiol), a butylene glycol (1,3-butylene glycol, 1,4-butylene glycol, 2,3-butanediol, and the like), hexylene glycol, 1,3-propanediol (trimethylene glycol), and 1,6-hexanediol (hexamethylene glycol). Among them, glycerin, diglycerin, ethylene glycol, propylene glycol, and a polyethylene glycol are preferable.

The content of the water-containing alcohol or the water-containing polyvalent alcohol is 0% by mass to 80% by mass and preferably 0% by mass to 60% by mass in 100% by mass of the hydrogel.

The content of the alcohol in the water-containing alcohol or the water-containing polyvalent alcohol is 0.1% by mass to 80% by mass and preferably 0.1% by mass to 60% by mass in 100% by mass in the water-containing alcohol or the water-containing polyvalent alcohol.

[Method for Producing Hydrogel]

The hydrogel obtained by the hydrogel-formable composition of the present invention can be produced by mixing the water-soluble organic polymer (A), the silicate (B), the compound having the diphosphonic acid structure or the salt thereof (C), the compound (D) having or generating a positive charge of divalent or more, and water or the water-containing solvent to form a gel.

As a method for mixing each of the components, for example, an aqueous solution mixing the water-soluble organic polymer (A), the compound (D) and water or the water-containing solvent and an aqueous dispersion mixing the silicate (B), the compound (C), and water or the water-containing solvent are previously prepared, and thereafter a gel can be formed by mixing the two liquids.

As method for mixing each of the components in the hydrogel-formable composition, ultrasonic treatment can be used in addition to mechanical stirring or manual stirring. The mechanical stirring is preferable. For the mechanical stirring, a magnetic stirrer, a propeller stirrer, a rotating/revolving mixer, a disper, a homogenizer, a shaker, a vortex mixer, a ball mill, a kneader, a line mixer, an ultrasonic transmitter, or the like can be used. Among them, mixing with the magnetic stirrer, the propeller stirrer, the rotating/revolving mixer, or the line mixer is preferable.

The temperature at the time of mixing is the freezing point to the boiling point of the aqueous solution or the aqueous dispersion, preferably −5° C. to 100° C., and more preferably 0° C. to 50° C.

The mixture immediately after the mixing is in the form of the sol due to weak strength. A gel, however, is formed by allowing the mixture to stand. The time for allowing to stand is preferably 2 hours to 100 hours. The temperature for allowing to stand is −5° C. to 100° C. and more preferably 0° C. to 50° C. Any shape of the gel can be prepared by pouring the mixture immediately after mixing and before forming the gel into a mold or by extrusion molding.

The water-soluble organic polymer (A) is generally used as a thickener and a viscosity increases as the concentration of the water-soluble organic polymer increases in an aqueous solution formed by mixing the water-soluble organic polymer with water or the water-containing solvent. The viscosity, however, is lowered due to reduction in the interaction in the polymer when an ionic compound such as the compound (D) is added. Due to this effect, therefore, the concentration of the water-soluble organic polymer (A) can be increased while the viscosity is reduced in the aqueous solution formed by mixing the water-soluble organic polymer (A), the compound (D), and water or the water-containing solvent.

Various compounds have been known as a dispersant for the silicate (B). Examples of general dispersants include a condensed phosphate represented by sodium pyrophosphate and a polycarboxylic acid salt represented by a sodium polyacrylate. By using these dispersants, however, when the silicate has a high concentration of 10% or higher, the sol stability decreases and the viscosity significantly increases or fluidity is completely lost due to formation of the gel. On the other hand, sodium etidronate has been known to have a higher effect of stabilizing the sol than the above-described dispersants so that the concentration of the silicate can be increased. As a silicate to which sodium etidronate is added, LAPONITE S482 (manufactured by Rockwood Additives Ltd.) is sold. LAPONITE S482 has been known to be dispersible in water at a high concentration of 25% at maximum and to retain the sol state for a long period of one year or longer.

According to the description of Patent Document 4, a hydrogel having a self-supporting property can be produced by mixing a water-soluble organic polymer, a silicate, and a water dispersant of the silicate. When the dispersant is sodium etidronate, however, a hydrogel cannot be produced. The reason for this is considered that the interaction between the silicate and the water-soluble organic polymer is inhibited because sodium etidronate has remarkably strong interaction to the silicate and thus a three-dimensional network being the basic structure of a gel is not formed.

Sodium etidronate is also used as a chelating agent in addition to the dispersant. Sodium etidronate is generally added to detergents, shampoos, and the like and has the effect of capturing metal ions in water by chelating action to increase foaming and detergency. Due to the application of this chelating effect, the gel can be formed by adding the compound (D) represented by a magnesium compound or a calcium compound to a composition containing the water-soluble organic polymer, the silicate, and the sodium etidronate dispersant. The reason for this is considered that the interaction between the compound having the diphosphonic acid structure and the silicate is inhibited by forming a chelate complex of a magnesium compound or a calcium compound with the compound having the diphosphonic acid structure and that the water-soluble organic polymer interacts with the silicate to form a crosslinked structure.

EXAMPLES

Subsequently, the contents of the present invention will be specifically described with reference to Examples. The present invention, however, is not limited to these Examples.

Production Example 1: Production of 1% Magnesium Chloride-Added 2% Sodium Polyacrylate Aqueous Solution In 97 parts of water, 1 part of magnesium chloride hexahydrate (manufactured by JUNSEI CHEMICAL CO., LTD.) was dissolved and thereafter 2 parts of sodium polyacrylate (manufactured by Wako Pure Chemical Industries, Ltd., degree of polymerization: 22,000 to 70,000) was added, followed by stirring the mixture at 25° C. until the solution became homogeneous to give a target product.

Production Example 2: Production of Sodium Etidronate-Added 10% LAPONITE XLG Aqueous Dispersion In 89.5 parts of water, 0.5 part of disodium etidronate (manufactured by Tokyo Chemical Industry Co., Ltd.) was dissolved and thereafter 10 parts of LAPONITE XLG (manufactured by Rockwood Additives Ltd.) was added, followed by stirring the mixture for 24 hours at 25° C. to give a target product.

Example 1: Production of Sodium Etidronate-Added 5% LAPONITE XLG Hydrogel

A mixture of 50 parts of the 1% magnesium chloride-added 2% sodium polyacrylate aqueous solution produced in Production Example 1 and 50 parts of the sodium etidronate-added 10% LAPONITE XLG aqueous dispersion produced in Production Example 2 was prepared and the mixture was stirred for 1 minute with a magnetic stirrer. The mixture was allowed to stand at room temperature for 48 hours to give a hydrogel.

Comparative Production Example 1: Production of Sodium Polyacrylate-Added 10% LAPONITE XLG Aqueous Dispersion In 79.5 parts of water, 7.5 parts of a 40% sodium polyacrylate aqueous solution (JURYMER AC-103: manufactured by Toagosei Co., Ltd., weight average molecular weight 6,000) was dissolved and thereafter 10 parts of LAPONITE XLG (manufactured by Rockwood Additives Ltd.) and then 3 parts of a 10% citric acid aqueous solution were added. The mixture was stirred at 80° C. for 1 hour to give a target product.

Comparative Example 1: Production of Sodium Polyacrylate-Added 5% LAPONITE XLG Hydrogel A mixture of 50 parts of the 1% magnesium chloride-added 2% sodium polyacrylate aqueous solution produced in Production Example 1 and 50 parts of the sodium polyacrylate-added 10% LAPONITE XLG aqueous dispersion produced in Comparative Production Example 1 was prepared and the mixture was stirred for 1 minute with a magnetic stirrer. The mixture was allowed to stand at room temperature for 48 hours to give a hydrogel.

Example 2: Piercing Strength Test of Hydrogel

Columnar hydrogels having a diameter of 28 mm and a height of 13 mm were produced under the conditions of Example 1 and Comparative Example 1 and the piercing strength was measured with Creep Meter RE2-33005B manufactured by Yamaden Co., Ltd. In the measurement, a columnar shaft having a diameter of 3 mm (a plunger manufactured by Yamaden Co., Ltd., a columnar shape, No. 3S, Type P-3S) was pressed from the upper part of the gel at a speed of 1 mm/sec to measure the strain rate and stress until the gel fracture was measured. The elastic modulus was determined from the slope of the region having a small strain rate of the stress-strain curve. The measurement results are listed Table 1 and illustrated in FIG. 1. The sodium etidronate-added hydrogel in Example 1 had an elastic modulus of about twice of that of the sodium polyacrylate-added hydrogel of Comparative Example 1, and thus was a harder hydrogel.

TABLE 1

Figure 1:
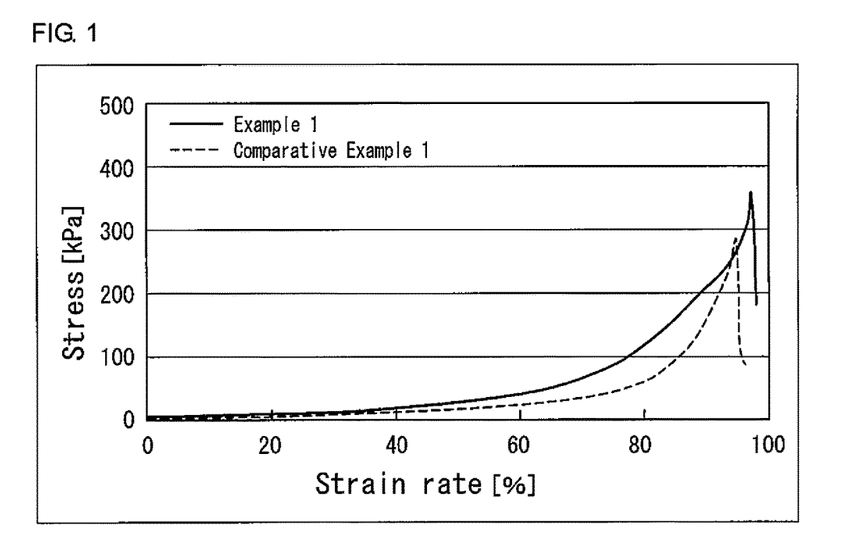
FIG. 1 is a graph illustrating the measurement results of a piercing strength test in Example 2.

| | Breaking stress [kPa] | Breaking strain rate [%] | Elastic modulus [kPa] |
|---|---|---|---|
| Example 1 | 335 | 97 | 110 |
| Comparative Example 1 | 286 | 95 | 56 |

Example 3: Production of 5% LAPONITE S482 Hydrogel

Figure 2:
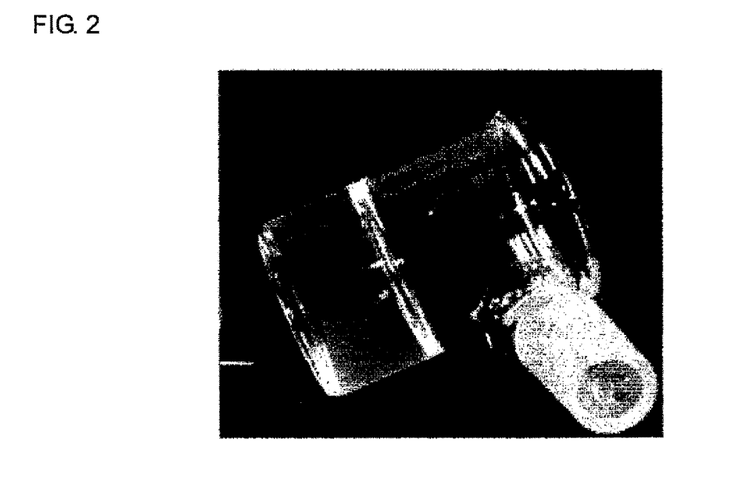
FIG. 2 is a photograph illustrating a hydrogel obtained in Example 3.

A mixture of 5 parts of LAPONITE S482 (manufactured by Rockwood Additives Ltd., Silicic Acid, Lithium Magnesium Sodium Salt 92-97%, containing at most 8% of sodium etidronate as a dispersant) and 45 parts of water was prepared and the mixture was stirred at 25° C. until the mixture became a homogeneous state. To the mixture, 50 parts of the 1% magnesium chloride-added 2% sodium polyacrylate aqueous solution produced in Production Example 1 was added and the resultant mixture was stirred for 1 minute with a magnetic stirrer. The mixture was allowed to stand at room temperature for 48 hours to give a hydrogel as illustrated in FIG. 2.

Comparative Production Example 2: Production of 2% Sodium Polyacrylate Aqueous Solution A mixture of 2 parts of sodium polyacrylate (manufactured by Wako Pure Chemical Industries, Ltd., degree of polymerization: 22,000 to 70,000) and 98 parts of water was prepared and stirred at 25° C. until the mixture turned into a homogeneous solution to give a target product.

Comparative Example 2: Gelation Formulation without Adding Compound (D)

Figure 3:
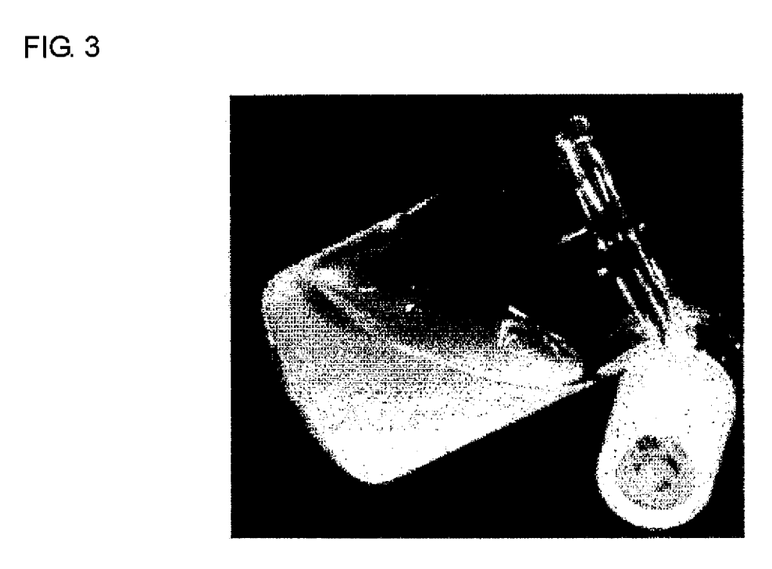
FIG. 3 is a photograph illustrating the results of a gelation formulation in Comparative Example 2.

A mixture of 5 parts of LAPONITE S482 (manufactured by Rockwood Additives Ltd.: including sodium etidronate as a dispersant) and 45 parts of water was prepared and the mixture was stirred at 25° C. until the mixture became a homogeneous state. 50 parts of the 2% sodium polyacrylate aqueous solution produced in Comparative Production Example 2 was added and the mixture was stirred for 1 minute with a magnetic stirrer. The mixture was allowed to stand at room temperature for 48 hours. The mixture, however, did not form a gel, remaining in the fluidized state immediately after stirring as illustrated in FIG. 3.

INDUSTRIAL APPLICABILITY

The hydrogel of the present invention is easy to produce and allows the strength of the hydrogel such as breaking stress and elastic modulus to be controlled by adjusting the composition components. The obtained gel has high transparency and stretchability and is easily processed. The gel can be applied to various products by utilizing its characteristics.

Examples of the application of the hydrogel of the present invention include medical materials including external drug base materials such as wound dressing materials, hap agents, and hemostatic materials, surgical sealant materials, scaffolding materials for regenerative medicine, artificial corneas, artificial crystalline lenses, artificial vitreous bodies, artificial skins, artificial joints, artificial cartilages, implant materials such as materials for breast augmentation, and materials for soft contact lenses, culture medium materials for tissue culture or microbial culture, cosmetic materials such as sheets for packing, sanitary materials such as children's and adult's diapers and sanitary napkins, gel materials for fragrance or deodorant, gum materials for confectionery or dogs, chromatographic carrier materials, bioreactor carrier materials, separation function membrane materials, building and civil engineering materials such as incombustible materials for building materials, fireproof covering materials, fire extinguishing agents, humidity conditioning materials, earthquake absorbers, debris flow preventing materials, or sandbags, greening materials such as a soil water retention agents, culture media for raising seedlings, and supports for hydroponic culture for agricultural and horticulture, toy materials for children's toys or models, materials for stationery, shock absorbing materials of sporting goods such as sports shoes and protectors, cushioning materials for shoe soles, cushioning materials for bulletproof vests, cushioning materials for automobiles, cushioning materials for transportation, packing materials, cushioning and protective mat materials, shock buffer materials inside electronic devices, cushioning materials for transport carts for precision parts such as optical instruments and semiconductor related parts, vibration-proof and damping materials for industrial equipment, sound reduction materials of industrial equipment such as motor-using equipment and compressors, rubber substitute materials for tires and rubber bands, environmentally harmonious materials such as plastic substitute materials, coating materials of friction parts in devices, paint additives, waste treatment such as gelling agents or anti-mud agents for waste mud, adhesives, sealing materials for sealing, gel electrolyte materials for primary batteries, secondary batteries, and capacitors, electronic materials such as gel electrolyte materials for dye sensitized solar batteries or materials for fuel batteries, and materials for photographic films.

The invention claimed is:

1. A hydrogel-formable composition capable of forming a hydrogel having a self-supporting property, the hydrogel-formable composition comprising: a water-soluble organic polymer (A) having an organic acid structure, an organic acid salt structure, or an organic acid anion structure; a silicate (B); a compound having a diphosphonic acid structure of Formula (I):

(1)

(wherein
R$_1$ and R$_2$ each are independently a hydrogen atom, hydroxy group, a halogen atom, an optionally substituted linear, branched, or cyclic alkyl group, alkyloxy group, or alkylthio group having a carbon number of 1 to 12, an optionally substituted amino group, an optionally substituted monovalent C$_{6-12}$ aromatic group, or a monovalent C$_{3-12}$ heteroaromatic group having at least one nitrogen atom, oxygen atom, or sulfur atom as a ring-forming atom;
X$_1$ and X$_2$ each are independently a single bond or a linking group; and
n is an integer of 1 to 5) or a salt thereof (C); and a compound (D) having or generating a positive charge of divalent or more.

2. The hydrogel-formable composition according to claim 1, wherein the compound or the salt thereof (C) is one or more compounds selected from the group consisting of a compound having a diphosphonic acid structure and a fully neutralized or partially neutralized sodium salt, potassium salt, and ammonium salt thereof.

3. The hydrogel-formable composition according to claim 2, wherein the compound or the salt thereof (C) is one or more compounds selected from the group consisting of etidronic acid, alendronic acid, risedronic acid, ibandronic acid, clodronic acid, minodronic acid, pamidronic acid, tiludronic acid, zoledronic acid, and 1,2-ethylenediphosphonic acid, and a fully neutralized or partially neutralized sodium salt, potassium salt, and ammonium salt of etidronic acid, alendronic acid, risedronic acid, ibandronic acid, clodronic acid, minodronic acid, pamidronic acid, tiludronic acid, zoledronic acid, or 1,2-ethylenediphosphonic acid.

4. The hydrogel-formable composition according to claim 1, wherein the water-soluble organic polymer (A) is a water-soluble organic polymer having a carboxylic acid structure, a carboxylic acid salt structure, or a carboxy anion structure.

5. The hydrogel-formable composition according to claim 4, wherein the water-soluble organic polymer (A) is a fully neutralized or partially neutralized polyacrylate.

6. The hydrogel-formable composition according to claim 5, wherein the water-soluble organic polymer (A) is a fully neutralized or partially neutralized polyacrylate having a weight average molecular weight of 1,000,000 to 10,000,000.

7. The hydrogel-formable composition according to claim 1, wherein the silicate (B) is water-swellable silicate particles.

8. The hydrogel-formable composition according to claim 7, wherein the silicate (B) is water-swellable silicate particles selected from the group consisting of smectite, bentonite, vermiculite, and mica.

9. The hydrogel-formable composition according to claim 1, wherein the compound (D) is one or more compounds selected from the group consisting of a salt of an element of the third period to the fifth period and the second group to the fourteenth group in the periodic table, a hydroxide of the element, an oxide of the element, a polyvalent amine, and a salt of the polyvalent amine.

10. The hydrogel-formable composition according to claim 9, wherein the compound (D) is one or more compounds selected from the group consisting of magnesium chloride, magnesium bromide, magnesium sulfate, magnesium nitrate, magnesium carbonate, magnesium acetate, magnesium hydroxide, magnesium oxide, magnesium citrate, magnesium silicate, magnesium oxalate, magnesium fluoride, magnesium phosphate, magnesium benzoate, magnesium lactate, calcium chloride, calcium bromide, calcium sulfate, calcium nitrate, calcium carbonate, calcium acetate, calcium hydroxide, calcium oxide, calcium lactate, calcium phosphate, calcium diphosphate, calcium hexametaphosphate, aluminum sulfate, aluminum hydroxide, aluminum oxide, ethylenediamine dihydrochloride, ethylenediamine sulfate, bis(aminoethoxy)ethane dihydrochloride, and bis(aminoethoxy)ethane sulfate.

11. A hydrogel having a self-supporting property, wherein the hydrogel is formed from the hydrogel-formable composition as claimed in claim 1.

12. A method for producing a hydrogel having a self-supporting property, the method comprising: mixing the water-soluble organic polymer (A), the silicate (B), the compound or the salt thereof (C), the compound (D) each of which is claimed in claim 1, and water or a water-containing solvent to form a gel.

13. A method for producing a hydrogel having a self-supporting property, the method comprising: mixing two liquids of an aqueous solution formed by mixing the water-soluble organic polymer (A) and the compound (D) each of which is claimed in claim 1 and water or a water-containing solvent and an aqueous dispersion formed by mixing the silicate (B) and the compound or the salt thereof (C) and water or a water-containing solvent to form a gel.

\* \* \* \* \*